United States Patent
Duan et al.

(10) Patent No.: US 9,927,968 B2
(45) Date of Patent: Mar. 27, 2018

(54) MOVE OF OBJECT BETWEEN PAGES OF EDITABLE DOCUMENT

(71) Applicant: International Business Machines Corporation, Armonk, NY (US)

(72) Inventors: Xue Fei Duan, Beijing (CN); Ji Yan, Beijing (CN); Dong Jun Zong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 14/799,857

(22) Filed: Jul. 15, 2015

(65) Prior Publication Data
US 2016/0034325 A1    Feb. 4, 2016

(30) Foreign Application Priority Data

Jul. 30, 2014    (CN) .......................... 2014 1 0370561

(51) Int. Cl.
  *G06F 3/0486*    (2013.01)
  *G06F 17/24*    (2006.01)
(52) U.S. Cl.
  CPC ............ *G06F 3/0486* (2013.01); *G06F 17/24* (2013.01)
(58) Field of Classification Search
  CPC ... G06F 3/0486; G06F 3/04842; G06F 17/212
  See application file for complete search history.

(56) References Cited

U.S. PATENT DOCUMENTS

| | | | |
|---|---|---|---|
| 7,246,307 B2 | 7/2007 | Arora et al. | |
| 7,543,267 B2 | 6/2009 | Lindhorst et al. | |
| 7,620,906 B2 | 11/2009 | Igeta | |
| 8,423,890 B2 | 4/2013 | Oda | |
| 9,293,108 B2* | 3/2016 | Chen ........................ | G09G 5/00 |
| 2003/0210281 A1 | 11/2003 | Ellis et al. | |
| 2009/0235177 A1* | 9/2009 | Saul ....................... | G06F 3/0227 715/740 |
| 2013/0222283 A1* | 8/2013 | Yun ........................ | G06F 3/0488 345/173 |

FOREIGN PATENT DOCUMENTS

| | | |
|---|---|---|
| CN | 103324404 A | 9/2013 |
| JP | 2004070450 A | 3/2004 |
| WO | WO2012091289 A1 | 7/2012 |

OTHER PUBLICATIONS

M. Kobayashi, et al., "Boomerang: Suspendable Drag-and-Drop Interactions Based on a Throw-and-Catch Metaphor," Proceedings of the 20th annual ACM symposium on User interface software and technology pp. 187-190.

(Continued)

*Primary Examiner* — Alvin Tan
(74) *Attorney, Agent, or Firm* — Cantor Colbur LLP; Ed Choi

(57) ABSTRACT

Embodiments relate to moving an object between pages of an editable document. An aspect includes determining that the object in an edit page of the editable document has been dragged to a target page thumbnail of the editable document. Another aspect include zooming in the target page thumbnail. Yet another aspect includes moving the object in the zoomed-in target page thumbnail.

9 Claims, 8 Drawing Sheets

(56) References Cited

OTHER PUBLICATIONS

P. Dragicevic, "Combing Crossing-Based and Paper-Based Interaction Paradigms for Dragging and Dropping Between Overlapping Windows," Proceedings of the 17th annual ACM symposium on User interface software and technology pp. 193-196.
First CN Office Action; Application No. CN 201410370561.0; dated Jan. 11, 2018; 6 pages.

\* cited by examiner

MOVE OF OBJECT BETWEEN PAGES OF EDITABLE DOCUMENT

FOREIGN PRIORITY

The present application claims priority to Chinese Application No. 201410370561.0 filed Jul. 30, 2014 and all benefits accruing therefrom under U.S.C. § 119, the contents of which are incorporated herein in its entirety.

BACKGROUND

The present disclosure relates generally to moving an object between pages, and more particularly, to moving an object between pages of an editable document.

Editor software, such as text editor software and photo editor software, is usually used to create an object and edit the object's information such as shape, graphic, link, etc. When using the editor software to generate or process an editable document, a user often needs to move objects between different pages.

When the user wants to move an object from one page to another, the user typically copies or cuts the object in a source page, and then switches from the source page to a target page and pastes the object at a desired position of the target page. Thus, when the object is moved between different pages, it is necessary to switch between the source page and the target page. In this way, if the target page is far away from the source page, a longer time is required to move the object, which renders the user's operation inconvenient. Especially when the user operates on a mobile device without a mouse, it may be difficult to move an object from one page to another. Moreover, after the object is moved to the target page, as the current edit page becomes the target page, if the user wants to continue to edit the source page, the user has to switch back to the source page, further resulting in an increased time for moving the object.

SUMMARY

Embodiments relate to moving an object between pages of an editable document. An aspect includes determining that the object in an edit page of the editable document has been dragged to a target page thumbnail of the editable document. Another aspect include zooming in the target page thumbnail. Yet another aspect includes moving the object in the zoomed-in target page thumbnail.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DRAWINGS

Various embodiments will now be described, by way of example only, with reference to the following drawings in which.

Figure 4A:
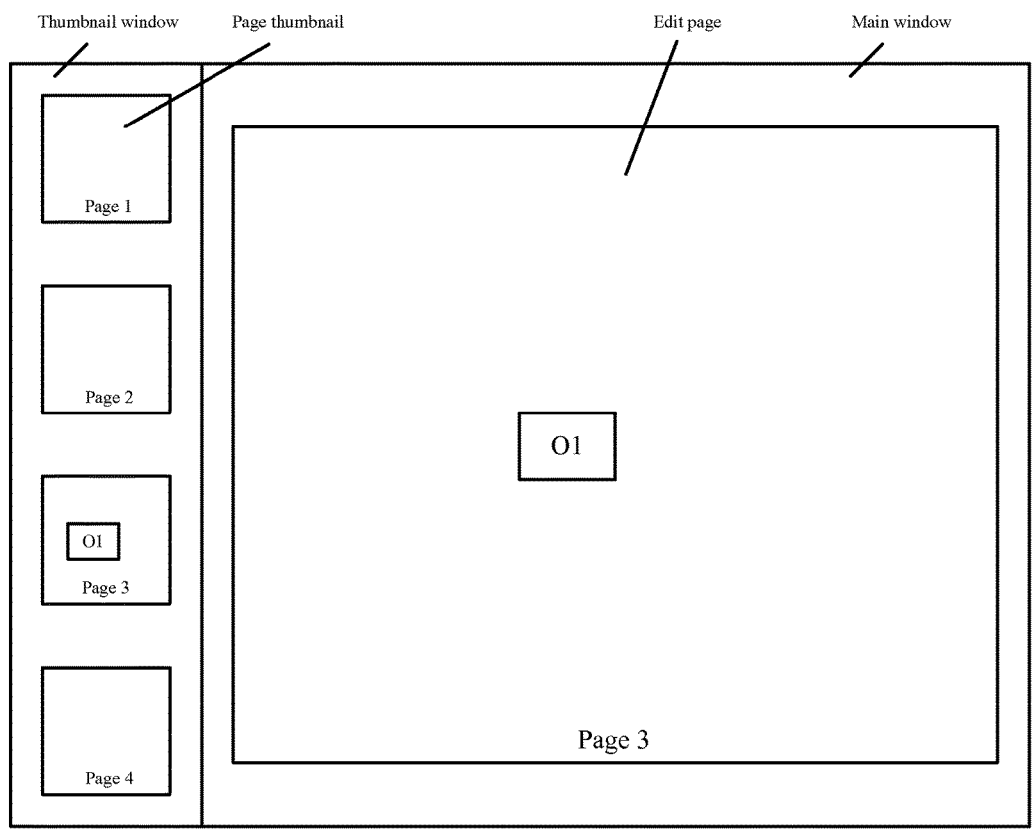
Figure 4B:
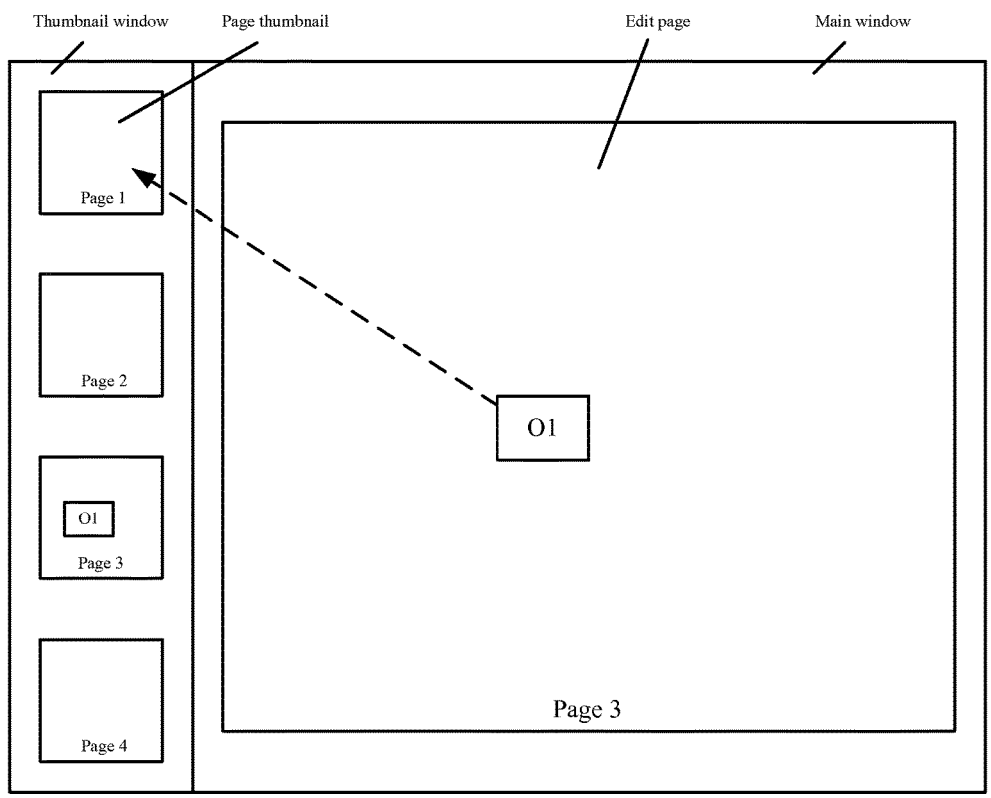
Figure 4C:
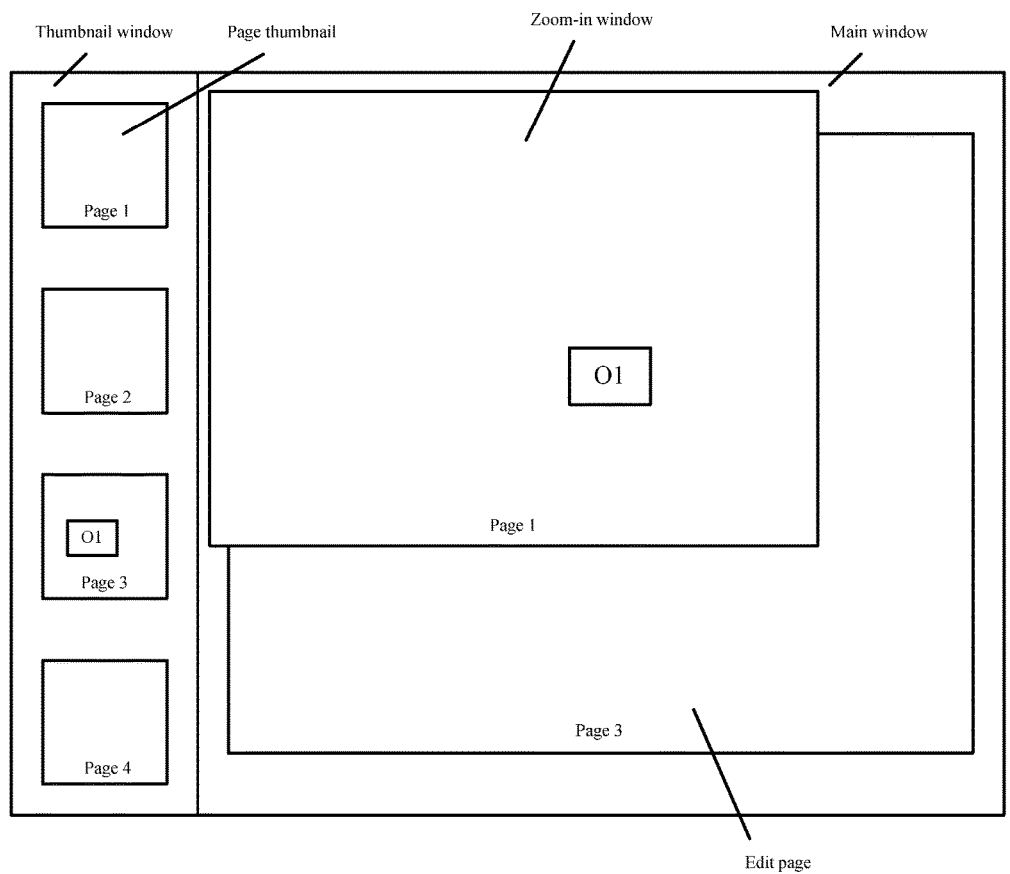
Figure 4D:
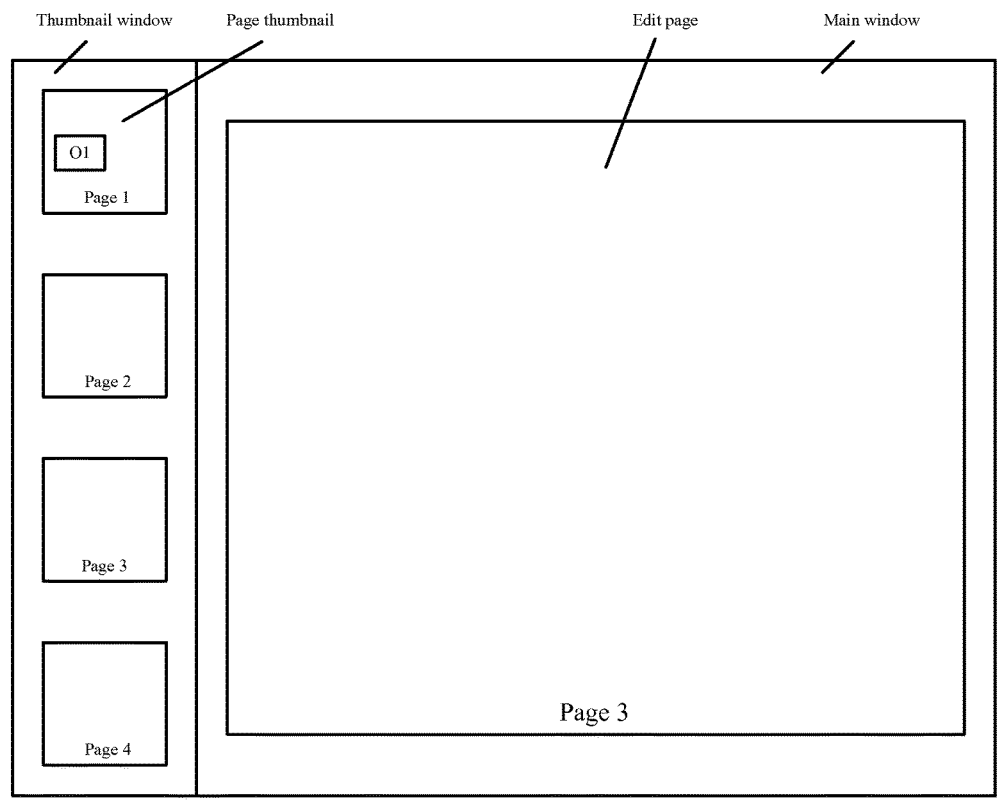
Figure 5:
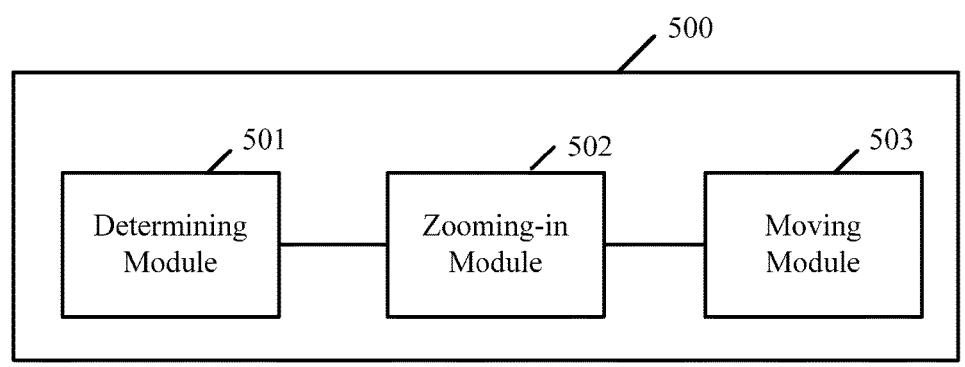

FIGS. 4A-D are a schematic diagrams for illustrating an example of the process of moving an object between pages in accordance with an embodiment; and FIG. 5 is a schematic block diagram of the apparatus for moving an object between pages of an editable document in accordance with an embodiment.

DETAILED DESCRIPTION

According to an embodiment, there is provided a method for moving an object between pages of an editable document, which comprises: determining that the object in an edit page of the editable document is dragged to a target page thumbnail of the editable document; zooming in the target page thumbnail; and moving the object in the zoomed-in target page thumbnail.

According further embodiments, there is provided an apparatus for moving an object between pages of an editable document, which comprises: a determining module configured to determine that the object in an edit page of the editable document is dragged to a target page thumbnail of the editable document; a zooming-in module configured to zoom in the target page thumbnail; and a moving module configured to move the object in the zoomed-in target page thumbnail.

The method and the apparatus for moving an object between pages of an editable document according to various embodiments can rapidly move the object between different pages without switching the pages, thus reducing the time required to move the object, and enabling the user to operate conveniently.

Figure 1:
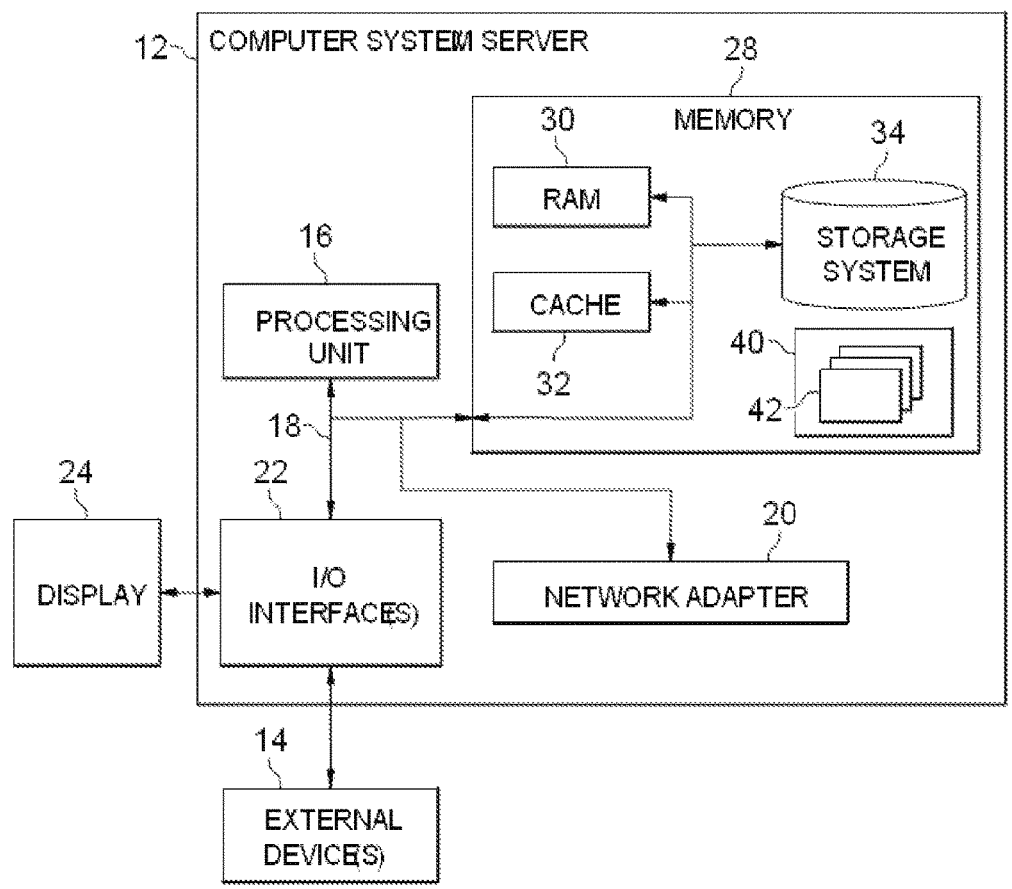
FIG. 1 shows a computer system/servicer in accordance with an embodiment.

Referring now to FIG. 1, in which a computer system/server 12 which is applicable to implement various embodiments is shown. Computer system/server 12 is only illustrative and is not intended to suggest any limitation as to the scope of use or functionality of various embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of various embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of various embodiments.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
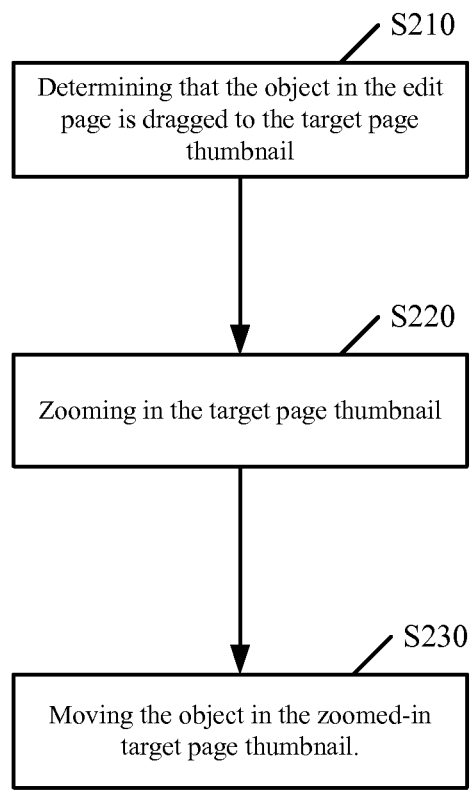
FIG. 2 is a flowchart of the method for moving an object between pages of an editable document in accordance with an embodiment.

FIG. 2 illustrates a flowchart of the method for moving an object between pages of an editable document according to an embodiment. The present embodiment will be described in detail below with reference to the accompanying drawing.

The method of the present embodiment may be implemented in the editor software which can implement control of page thumbnails. In this embodiment and following embodiments, an editable document refers to a document that can be generated or processed by the editor software. The page refers to a space including objects and/or content, which can be used to edit information of the objects, including but not limited to, moving objects. The objects refer to objects that can be selected by a user in the editable document, such as images, tables, texts, and so on.

As shown in FIG. 2, in block S210, it is determined that the object on an edit page of the editable document is dragged to a target page thumbnail of the editable document. In the present embodiment, when the editable document is processed by the editor software, the edit page of the editable document and a plurality of page thumbnails of the editable document can be displayed. In this embodiment, the edit page refers to a page currently being edited, and the page thumbnail refers to a micro view of the page. Typically, a window for presenting the edit page may be called a "main window". A window for presenting a plurality of page thumbnails may be called a "thumbnail window". The thumbnail window may be used to quickly browse or search for all pages of the editable document.

Figure 3:
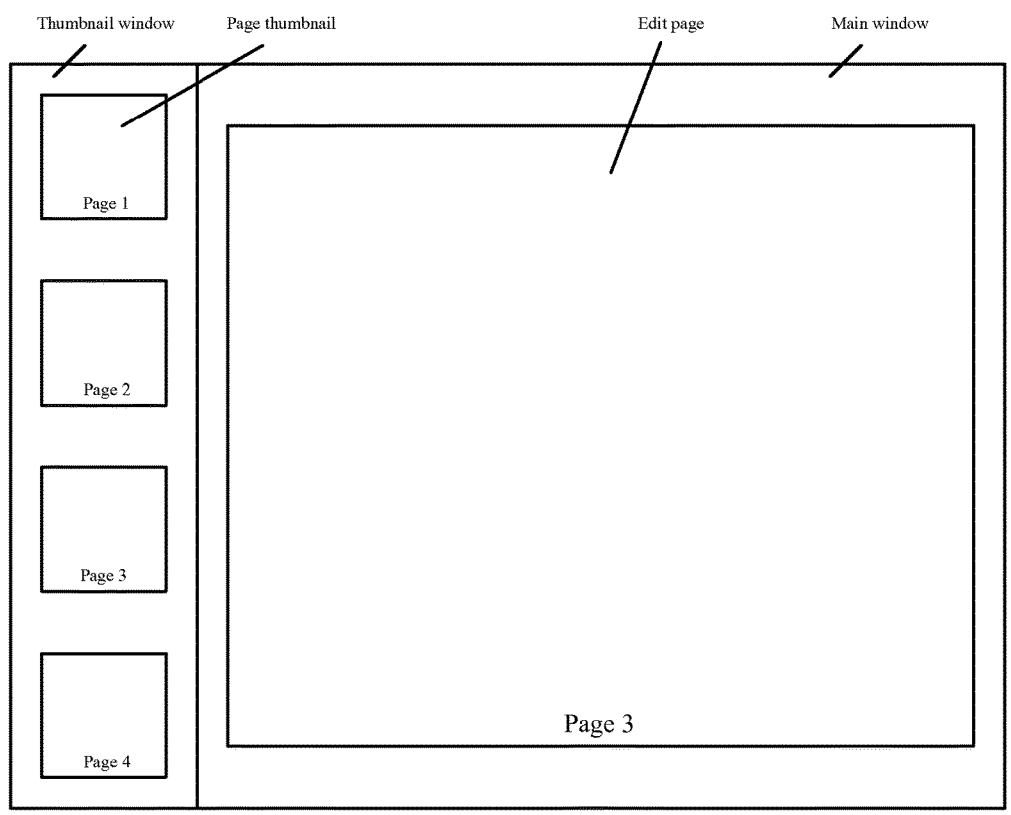
FIG. 3 is a schematic diagram of a layout of a display interface when an editable document is processed by editor software in accordance with an embodiment.

FIG. 3 shows a schematic diagram of a layout of a display interface when an editable document is processed by the editor software. As shown in FIG. 3, the display interface includes the thumbnail window on the left side and the main window on the right side. In the main window, the current edit page is included. In the thumbnail window, four page thumbnails are included, one of which is the page thumbnail to which the current edit page corresponds. Typically, when the user clicks on any page thumbnail, a page corresponding to the clicked page thumbnail will be presented in the main window, the page becoming the current edit page.

The layout of the display interface shown in FIG. 3 is merely illustrated as an example, and those skilled in the art will appreciate that other layouts may be used in addition to the layout of the display interface shown in FIG. 3.

In block S210, when the user wants to move an object in the edit page to another page (hereinafter referred to as "a target page"), it is determined whether the object is dragged to the target page thumbnail based on a drag position of the object.

In one embodiment, firstly, a selection input directed to the object in the edit page is received. When the user selects the object by using a mouse, a finger or a stylus, the corresponding selection input indicating that the object has been selected will be generated. In the case of the mouse, the selection input may be generated by an operation of clicking the object. In the case of the finger or stylus, the selection input may be generated by an operation of touching the object. According to the selection input, it can be determined which object has been selected in the edit page, and attribute information of the selected object can be obtained.

Next, a drag input of the selected object is received. When the user drags the selected object, the corresponding drag input will be generated. In the case of the mouse, the drag input may be generated by pressing a function key of the mouse and moving the mouse in the case that the object has been selected. In the case of the finger or stylus, the drag input may be generated by touching the object and at the same time moving the finger or the stylus. In addition, the drag may also be any other operation that can move the object.

Based on the received drag input, the current drag position of the object can be obtained. In the present embodiment, the drag position may be represented by coordinates. For example, let the upper left corner of the display screen be an origin of the coordinates, an axis along a horizontal direction of the display screen be X-axis, and an axis along a vertical direction of the display screen be Y-axis. In this way, the coordinates of the drag position and the coordinates of four corners of the respective page thumbnails may be obtained to determine a region of the respective page thumbnails.

Then, it is determined whether the current drag position is within the region of the target page thumbnail. If the current drag position is within the region of the target page thumbnail, it can be determined that the object has been dragged to the target page thumbnail.

In another embodiment, after determining that the current drag position is within the region of the target page thumbnail, it is further determined whether a hold time period during which the current drag position is within the region of the target page thumbnail exceeds a predetermined time. In the case that the hold time period exceeds the predetermined time, it is determined that the object has been dragged to the target page thumbnail. In this way, it can be determined more accurately that the object has been dragged to the target page thumbnail, to avoid wrongly determining that the object has been dragged to the target page thumbnail as the object is dragged through other page thumbnail.

Then, after determining that the object has been dragged to the target page thumbnail, in block S220, in response to the determination, the target page thumbnail can be zoomed in to continue to drag the object in the zoomed-in target page thumbnail. In the present embodiment, a zoom percent of the target page thumbnail may be set so that the size of the zoomed-in target page thumbnail is larger than the original size of the target page thumbnail and smaller than the size of the edit page.

In one embodiment, the target page thumbnail may be zoomed in according to a predetermined percent at the position of the target page thumbnail. That is, the target page thumbnail is zoomed in at its original position in the thumbnail window.

In another embodiment, the zoomed-in target page thumbnail may be presented in a new window. Specifically, first a new zoom-in window is created above the main window and the thumbnail window. The creation or generation of a window may be implemented by using the technologies commonly known in the art. The size of the zoom-in window may be set between the size of the page thumbnail and the size of the edit page. In an embodiment, the size of the zoom-in window can allow the zoomed-in target page thumbnail to be completely presented. Next, the target page thumbnail is zoomed in according to a predetermined percent. Then, the zoomed-in target page thumbnail is presented in the zoom-in window, while the target page thumbnail in the thumbnail window remains unchanged.

Then, in block S230, the object is moved in the zoomed-in target page thumbnail. Accordingly, the object will be moved in the target page. After the target page thumbnail is zoomed in, the object may continue to be dragged in the zoomed-in target page thumbnail, until the drag is released. In the case of the mouse, when the pressed function key of the mouse is released, it indicates that the drag of the object is released. In the case of the finger or stylus, when the finger or the stylus is no longer touching the object, it indicates that the drag of the object is released.

In response to the drag of the object being released, a release position in the zoomed-in target page thumbnail is obtained, the release position becoming a position to which the object is ultimately moved. Then, the object is deleted from the edit page. Accordingly, the object will be deleted from the page thumbnail of the edit page. Then, the object is pasted at the release position in the zoomed-in target page thumbnail. Accordingly, the object will be pasted in the target page. Thus, the object is moved from the edit page to the target page. At this time, the edit page is still presented in the main window, and the user can continue to edit the edit page.

Further, after the object has been moved to the target page, the target page thumbnail may also be restored. If the target page thumbnail is zoomed in at the original position, the target page thumbnail can be restored by zooming out the target page thumbnail to the original size thereof. If the zoomed-in target page thumbnail is presented in the new zoom-in window, the target page thumbnail can be restored by closing the new zoom-in window.

It can be seen from the above description that the method for moving an object between pages of an editable document of the embodiment can implement the movement of the object utilizing the page thumbnail, so as to rapidly move the object between pages without switching the pages, and enable the user to operate conveniently. With the method of the present embodiment, the edit page remains unchanged after the movement of the object is completed. Furthermore, the method of the present embodiment is not only applicable to the movement of one object, but also applicable to the movement of a plurality of objects simultaneously.

Here is an example to illustrate the process of moving an object using the method of the embodiment shown in FIG. 2. FIGS. 4(a) to 4(d) schematically show the process of moving the object in the layout of the display interface shown in FIG. 3. It is assumed that the editable document includes four pages, and the user wants to move object O1 in Page 3 to Page 1. Therefore, the edit page presented in the main window is Page 3, and the target page is Page 1. As shown in FIG. 4 (a), the user selects the object O1 to be moved in Page 3. At this time, both Page 3 in the main window and the page thumbnail of Page 3 in the thumbnail window include the object O1. FIG. 4 (b) shows that the user drags the selected object O1 from Page 3 to the page thumbnail of Page 1 in the thumbnail window. When the object O1 is dragged to the page thumbnail of Page 1, the page thumbnail of Page 1 is zoomed in, as shown in FIG. 4 (c). In FIG. 4(c), the zoomed-in page thumbnail of Page 1 is presented in the new zoom-in window, while the page thumbnail of Page 1 in the thumbnail window remains unchanged. At this time, the page thumbnail of Page 3 still includes the object O1, and then the user can continue to drag the object O1 in the zoomed-in page thumbnail of Page 1, and release it until the object O1 reaches a certain position. In response to the release, the object O1 is deleted from Page 3 and the page thumbnail of Page 3, and is pasted at the release position in the page thumbnail of Page 1. Then the new zoom-in window is closed, and the object O1 is only included in the page thumbnail of Page 1, as shown in FIG. 4(d). It can be seen that, in FIG. 4(d), Page 3 is still presented in the main window.

Although FIG. 4 merely shows the process for moving one object between different pages, those skilled in the art will appreciate that a plurality of objects can be moved simultaneously as well by using the method of the embodiment as shown in FIG. 2.

FIG. 5 shows a schematic block diagram of the apparatus 500 for moving an object between pages of an editable document according to an embodiment. As shown in FIG. 5, the apparatus 500 of the present embodiment comprises: a determining module 501, which is configured to determine that the object in an edit page of the editable document is dragged to a target page thumbnail of the editable document; a zooming-in module 502, which is configured to zoom in the target thumbnail page; and a moving module 503, which configured to move the object in the zoomed-in target page thumbnail.

Typically, the edit page of the editable document may be presented in the main window, and a plurality of page thumbnails of the editable document including the page thumbnail of the edit page may be presented in the thumbnail window.

In the determining module 501, a receiving unit may receive a selection input of the object, and receive a drag input of the selected object. As described above, when the object is selected and dragged, the corresponding selection input and drag input will be generated. Based on the selection input, the selected object may be determined. Based on the drag input, an obtaining unit can obtain the current drag position of the object. Then a determining unit may determine whether the current drag position obtained thereby is within the region of the target page thumbnail. If the determining unit determines that the current drag position is within the region of the target page thumbnail, it indicates that the object has been dragged to the target page thumbnail. In addition, the determining unit may further determine whether the hold time period during which the current drag position is within the region of the target page thumbnail exceeds a predetermined time. In the case that the determining unit determines that the hold time period exceeds the predetermined time, it indicates that the object has been dragged to the target page thumbnail.

When the determining module 501 determines that the object has been dragged to the target page thumbnail, the zooming-in module 502 may, in response to the determination, zoom in the target page thumbnail. The zoom percent of the target page thumbnail may be set so that the size of the zoomed-in target page thumbnail is between the original size of the target page thumbnail and the size of the edit page.

In one embodiment, the zooming-in module 502 may zoom in the target page thumbnail according to a predetermined percent at the position of the target page thumbnail in the thumbnail window.

In another embodiment, in the zooming-in module 502, a creating unit creates a new zoom-in window over the main window and the thumbnail window. The creating unit may use the known technologies for creating or generating a window. The size of the zoom-in window may be set between the size of the page thumbnail and the size of the edit page. Next, the zooming-in unit zooms in the target page thumbnail according to a predetermined percent. The presenting unit presents the zoomed-in target page thumbnail in the zoom-in window, while the target page thumbnail in the thumbnail window remains unchanged.

Then, the moving module 503 moves the object in the zoomed-in target page thumbnail. Accordingly, the object is moved in the target page. In the moving module 503, a position obtaining unit obtains the release position in response to that the drag of the object is released in the zoomed-in target page thumbnail. In the zoomed-in target page thumbnail, the object may continue to be dragged, until the drag is released at a certain position. The release position is just the position to which the object is ultimately moved. After the position obtaining unit obtains the release position, a deleting unit deletes the object from the edit page, and a pasting unit pastes the object at the release position.

Further, the apparatus 500 of the present embodiment further comprises: a restoring module, which configured to restore the target page thumbnail. After the object is moved to the target page, the restoring module may restore the target page thumbnail by zooming out the zoomed-in target page thumbnail to the original size thereof, or by closing the new zoom-in window.

It should be noted that the apparatus 500 of the present embodiment can operationally implement the method for moving an object between pages of an editable document of the embodiment shown in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method for moving an object between pages of an editable document, comprising:
    displaying an interface comprising the object in an edit page of the editable document and a thumbnail window containing at least a target page thumbnail and an edit page thumbnail;
    determining that the object in the edit page of the editable document has been dragged to the target page thumbnail of the editable document;
    creating a zoom-in window over the edit page and the target page thumbnail, wherein the zoom-in window has a size between a size of the target page thumbnail and a size of the edit page;
    after creating the zoom-in window, zooming in the target page thumbnail according to a predetermined percent;
    presenting the zoomed-in target page thumbnail in the zoom-in window while the size of the target page thumbnail in the thumbnail window remains unchanged;
    moving the object in the zoom-in window by drag of the object; and
    in response to the drag of the object being released in the zoom-in window:
        obtaining a release position in the zoom-in window;
        deleting the object from the edit page and the edit page thumbnail;
        pasting the object at the release position in the zoom-in window and the target page thumbnail; and
        restoring the target page thumbnail by closing the zoom-in window.

2. The method according to claim 1, wherein determining that the object in the edit page of the editable document has been dragged onto a target page thumbnail of the editable document includes:
    receiving a selection input of the object;
    receiving a drag input of the selected object;
    obtaining a current drag position; and
    determining that the current drag position is within a region of the target page thumbnail.

3. The method according to claim 2, wherein determining that the object in the edit page of the editable document has been dragged to a target page thumbnail of the editable document further includes:
    determining that a hold time period during which the current drag position is within the region of the target page thumbnail exceeds a predetermined time.

4. A computer program product for moving an object between pages of an editable document, the computer program product comprising a computer readable storage medium having program instructions embodied therewith, the program instructions executable by a processor to cause the processor to:
    display an interface comprising the object in an edit page of the editable document and a thumbnail window containing at least a target page thumbnail and an edit page thumbnail;
    determine that the object in the edit page of the editable document has been dragged to the target page thumbnail of the editable document;
    create a zoom-in window over the edit page and the target page thumbnail, wherein the zoom-in window has a size between a size of the target page thumbnail and a size of the edit page;
    zoom in the target page thumbnail according to a predetermined percent after the zoom-in window is created;
    present the zoomed-in target page thumbnail in the zoom-in window while the size of target page thumbnail in the thumbnail window remains unchanged;
    move the object in the zoom-in window by drag of the object; and
    in response to the drag of the object being released in the zoom-in window:
        obtain a release position in the zoom-in window;
        delete the object from the edit page and the edit page thumbnail;
        paste the object at the release position in the zoom-in window and the target page thumbnail; and restore the target page thumbnail by closing the zoom-in window.

5. The computer program product according to claim 4, wherein determining that the object in the edit page of the editable document has been dragged onto a target page thumbnail of the editable document includes:
 receiving a selection input of the object;
 receiving a drag input of the selected object;
 obtaining a current drag position; and
 determining that the current drag position is within a region of the target page thumbnail.

6. The computer program product according to claim 5, wherein determining that the object in the edit page of the editable document has been dragged to a target page thumbnail of the editable document further includes:
 determining that a hold time period during which the current drag position is within the region of the target page thumbnail exceeds a predetermined time.

7. A computer system for moving an object between pages of an editable document, the system comprising:
 a memory; and
 a processor, communicatively coupled to said memory, the computer system configured to perform a method comprising:
 displaying an interface comprising the object in an edit page of the editable document and a thumbnail window containing at least a target page thumbnail and an edit page thumbnail;
 determining that the object in the edit page of the editable document has been dragged to the target page thumbnail of the editable document;
 creating a zoom-in window over the edit page and the target page thumbnail, wherein the zoom-in window has a size between a size of the target page thumbnail and a size of the edit page;
 after creating the zoom-in window, zooming in the target page thumbnail according to a predetermined percent;
 presenting the zoomed-in target page thumbnail in the zoom-in window while the size of target page thumbnail in the thumbnail window remains unchanged;
 moving the object in the zoom-in window by drag of the object; and
 in response to the drag of the object being released in the zoom-in window:
  obtaining a release position in the zoom-in window;
  deleting the object from the edit page and the edit page thumbnail;
  pasting the object at the release position in the zoom-in window and the target page thumbnail; and
  restoring the target page thumbnail by closing the zoom-in window.

8. The system according to claim 7, wherein determining that the object in the edit page of the editable document has been dragged onto a target page thumbnail of the editable document includes:
 receiving a selection input of the object;
 receiving a drag input of the selected object;
 obtaining a current drag position; and
 determining that the current drag position is within a region of the target page thumbnail.

9. The system according to claim 8, wherein determining that the object in the edit page of the editable document has been dragged to a target page thumbnail of the editable document further includes:
 determining that a hold time period during which the current drag position is within the region of the target page thumbnail exceeds a predetermined time.

* * * * *